United States Patent
Bastide et al.

(10) Patent No.: US 9,483,519 B2
(45) Date of Patent: Nov. 1, 2016

(54) AUTHORSHIP ENHANCED CORPUS INGESTION FOR NATURAL LANGUAGE PROCESSING

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 14/012,337

(22) Filed: Aug. 28, 2013

(65) Prior Publication Data

US 2015/0066968 A1    Mar. 5, 2015

(51) Int. Cl.
  *G06F 17/00* (2006.01)
  *G06F 17/30* (2006.01)

(52) U.S. Cl.
  CPC .............................. *G06F 17/30386* (2013.01)

(58) Field of Classification Search
  CPC .. G06F 17/28; G06F 17/274; G06F 17/2785; G06F 17/30011; G06F 17/30699; G06F 17/30705; G06F 17/30861; G06F 17/30864; G06F 17/30976; G06K 9/6267; G06K 9/00288; G06Q 30/0269
  See application file for complete search history.

(56) References Cited

U.S. PATENT DOCUMENTS

| | | | |
|---|---|---|---|
| 5,873,056 A | * | 2/1999 | Liddy et al. .................... 704/9 |
| 5,893,092 A | | 4/1999 | Driscoll |
| 6,654,735 B1 | | 11/2003 | Eichstaedt et al. |
| 7,209,876 B2 | * | 4/2007 | Miller et al. ....................... 704/9 |
| 7,337,158 B2 | * | 2/2008 | Fratkina ............ G06F 17/30654 706/45 |
| 8,291,492 B2 | | 10/2012 | McNally et al. |
| 2009/0287678 A1 | | 11/2009 | Brown et al. |

(Continued)

FOREIGN PATENT DOCUMENTS

| | | |
|---|---|---|
| CN | 102103594 A | 6/2011 |
| WO | WO 01/53970 A2 | 7/2001 |
| WO | WO2010/087882 A1 | 8/2010 |

OTHER PUBLICATIONS

Anonymous, "Method and System for Automatic Metadata Extraction and Question Answering in a File Sharing Application", http://priorartdatabase.com/IPCOM/000202537, Dec. 21, 2010, 3 pages.

(Continued)

*Primary Examiner* — Kavita Padmanabhan
*Assistant Examiner* — Warren Campbell, Jr.
(74) *Attorney, Agent, or Firm* — Stephen J. Walder, Jr.; David B. Woycechowsky

(57) ABSTRACT

Mechanisms for processing a corpus of information in a natural language processing system are provided. A corpus of information to process is identified and a set of author profiles associated with the corpus of information is retrieved. A content profile is generated for a portion of content of the corpus of information and the content profile is compared to the set of author profiles to generate an association of the content profile with at least one author profile in the set of author profiles. In addition, a processing operation of the natural language processing (NLP) system is controlled based on the association of the content profile with the at least one author profile.

24 Claims, 6 Drawing Sheets

(56) References Cited

U.S. PATENT DOCUMENTS

| | | | |
|---|---|---|---|
| 2010/0114562 A1* | 5/2010 | Hutchinson et al. | 704/9 |
| 2011/0066587 A1 | 3/2011 | Ferrucci et al. | |
| 2011/0125734 A1 | 5/2011 | Duboue et al. | |
| 2011/0231296 A1* | 9/2011 | Gross | G06Q 10/10 705/37 |
| 2011/0320442 A1 | 12/2011 | Faruquie et al. | |
| 2012/0179752 A1* | 7/2012 | Mosley | G06Q 10/10 709/204 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0097166 A1* | 4/2013 | Fink | G06Q 30/02 707/737 |
| 2013/0097176 A1 | 4/2013 | Khader et al. | |
| 2013/0144605 A1* | 6/2013 | Brager | G06F 17/3061 704/9 |
| 2013/0218862 A1* | 8/2013 | Ghosh | G06F 17/30554 707/706 |

OTHER PUBLICATIONS

High, Rob, "The Era of Cognitive Systems: An Inside Look at IBM Watson and How it Works", IBM Corporation, Redbooks, 2012, 16 pages.

IBM, "System and method for improving ingestion rate of data stores", http://www.ip.com/pubview/IPCOM000175631D, Oct. 16, 2008, 10 pages.

Starnes, Jane K. et al., "Knowledge Compass: Opening Windows, Punching Holes in Stovepipes, Forming Communities, Connecting People to People", Bulletin of the American Society for Information Science and Technology, vol. 29, No. 6, Aug./Sep. 2003, pp. 10-12.

Yuan, Michael J., "Watson and healthcare, How natural language processing and semantic search could revolutionize clinical decision support", IBM developerWorks, IBM Corporation, Apr. 12, 2011, 14 pages.

International Search Report and Written Opinion dated Dec. 2, 2014 for International Application No. PCT/CN2014/085002, 11 pages.

* cited by examiner

PLEASE SELECT ONE OR
MORE CORPORA:

☒ CANCER TREATMENTS

☐ LIVER DISEASES

410

☐ BONE DISEASES

...

PLEASE PROVIDE AUTHOR PROFILE
PRIORITIES FOR SELECTED CORPORA:  430    440

420

ONCOLOGY PHYSICIANS    | 1 |    REMOVE ☐

CANCER RESEARCH        | 2 |    REMOVE ☐
SPECIALISTS

NOVICE AUTHORS         |   |    REMOVE ☒

AUTHORSHIP ENHANCED CORPUS INGESTION FOR NATURAL LANGUAGE PROCESSING

BACKGROUND

The present application relates generally to an improved data processing apparatus and method and more specifically to mechanisms for performing authorship enhanced corpus ingestion for natural language processing.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, for processing a corpus of information in a natural language processing system. The method comprises identifying, by the data processing system, a corpus of information to process and retrieving, by the data processing system, a set of author profiles associated with the corpus of information. The method further comprises generating, by the data processing system, a content profile for a portion of content of the corpus of information and comparing, by the data processing system, the content profile to the set of author profiles to generate an association of the content profile with at least one author profile in the set of author profiles. In addition, the method comprises controlling a processing operation of the natural language processing (NLP) system based on the association of the content profile with the at least one author profile.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example diagram of a graphical user interface (GUI) for presenting author profile information for a selected corpora and receiving user selections of priorities for the author profiles in accordance with one illustrative embodiment;

DETAILED DESCRIPTION

Figure 1:
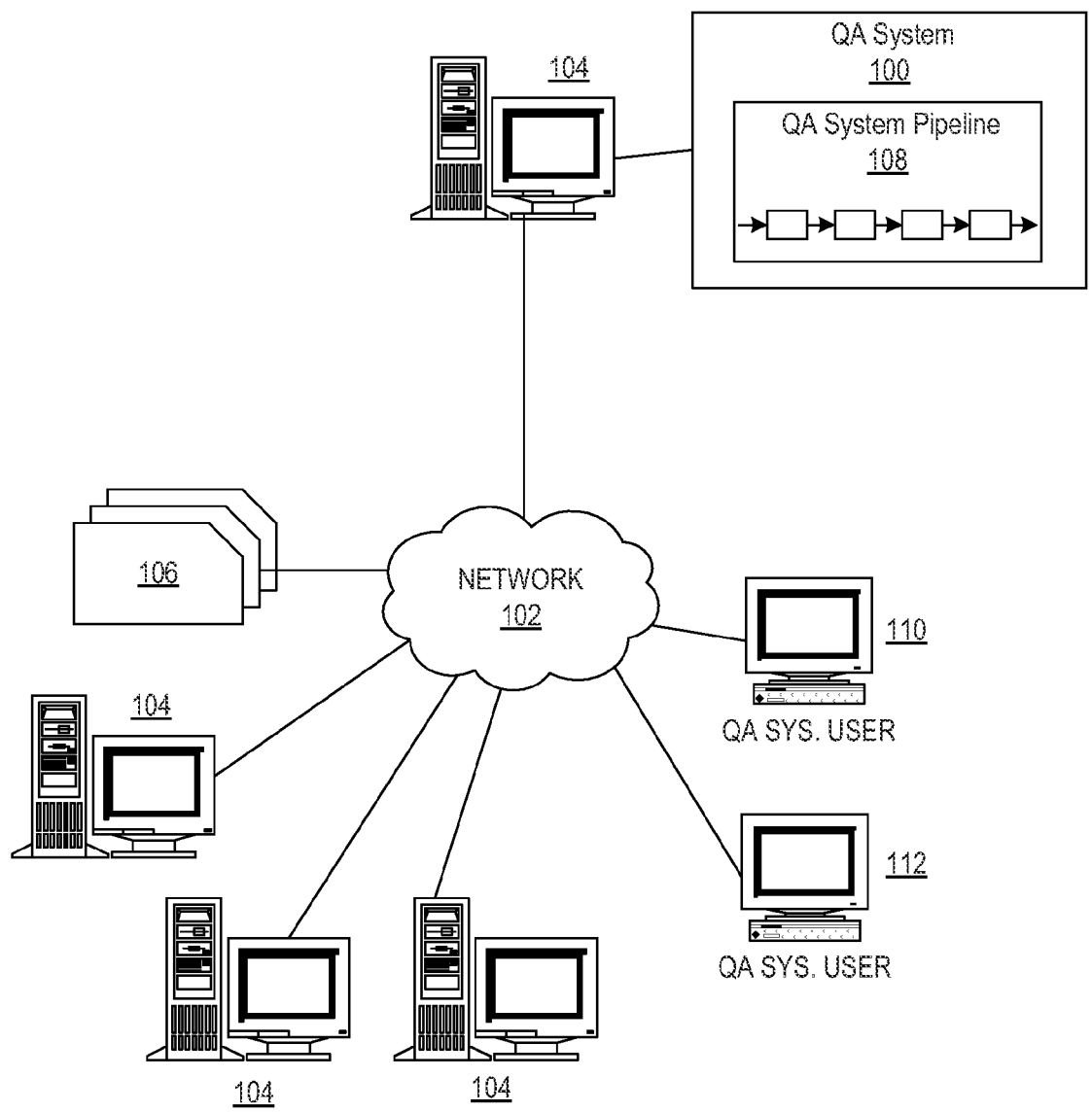
FIG. 1 is an example diagram of a distributed data processing system in which aspects of the illustrative embodiments may be implemented.

The illustrative embodiments provide mechanisms for performing authorship enhanced ingestion of documents that are part of a corpus of information for purposes of performing a natural language processing operation on the document. Natural Language Processing (NLP) is a technique that facilitates exchange of information between humans and data processing systems. For example, one branch of NLP pertains to transforming a given content into a human-usable language or form. For example, NLP can accept a document whose content is in a computer-specific language or form, and produce a document whose corresponding content is in a human-readable form.

Modern NLP algorithms are based on machine learning, especially statistical machine learning. One example implementation of NLP mechanisms that utilize machine learning is a question and answer (QA) system, such as the Watson™ QA system previously mentioned above. The paradigm of machine learning is different from that of most prior attempts at language processing which typically involved the direct hand coding of large sets of rules. The machine-learning paradigm calls instead for using general learning algorithms, often, although not always, grounded in statistical inference, to automatically learn such rules through the analysis of large corpora of typical real-world examples. A corpus (plural, "corpora") is a select set of documents, fragments (e.g., individual sentences, paragraphs, phrases, etc.), or data instances from one or more data sources. A corpus may be annotated with the correct values to be learned via a machine learning mechanism.

Many different classes of machine learning algorithms have been applied to NLP tasks. These algorithms take as input a large set of "features" that are generated from the input data. Some of the earliest-used algorithms, such as decision trees, produced systems of if-then rules based on these features, similar to the systems of hand-written rules that were then common. Increasingly, however, research has focused on statistical models which make probabilistic decisions based on attaching real-valued weights to each input feature. Such models have the advantage that they can express the relative certainty of many different possible answers rather than only one, producing more reliable results when such a model is included as a component of a larger system.

Often when working with massive sets of unstructured information, such as the documents in a corpus of information being ingested by a NLP mechanism or QA system, for example, there are documents in the set which have missing information. This missing information may include, for example, authorship information, attribution information, relevant dates of the materials presented in the document, or the like. NLP and QA systems may need such missing information to assist the QA system, for example, in effectively managing the QA system operations, such as prioritizing the loading of documents into memory or storage for evaluation by the QA system, establishing networks of relationships between documents in the corpus of information, or other QA system operations.

The missing information in the documents may be missing for a variety of different reasons. For example, the original authorship information of a document may have been lost over time, e.g., the author of the classical work the "Illiad" is not known, or the author wished to remain anonymous. As another example, data may have been lost in transmission from its original source or may have been corrupted when a document was converted from a hard-copy form to a digital form, e.g., a malfunction in the ingestion, a segment of a backup of a document is invalid, encrypted, or unrecoverable. As yet another example, an author may have chosen not to include the relevant authorship information because it was not deemed to be important based on the author's intended use of the document, e.g., a document of scientific notes may have not been intended to be consumed by others but acts as a log for the author.

In normal data mining activities, the missing data is determined from predetermined formulas and calculations or the data is discarded if it cannot be determined. However, this approach is not ideal for QA systems where more documents in the corpus that is ingested means that higher quality results are obtained, i.e. it is not beneficial in a QA system to discard documents because the authorship information is missing.

With the mechanisms of the illustrative embodiments, a corpus of information is selected for ingestion by a system, such as a QA system, NLP system or the like. Each document of the corpus of information is loaded by the system (e.g., QA system, NLP system, or the like) and analyzed using natural language processing techniques to extract key identifiers, associative natural language components/elements, and the like (referred to collectively as "features") from the document to thereby generate a profile of the document based on these extracted features. Among the extracted features there may be authorship features extracted from the document that provides an indication as to the identity of the author and/or a classification of the authorship of the document that may correspond to one or more predefined author profiles. The profile may be for the entire document or a portion of the document and is also referred to herein as a "content profile" meaning that the profile is associated with a particular corresponding portion of content of the document, e.g., the entire document or a sub-portion of the document.

The predefined author profiles may be specific to particular authors, e.g., an author profile may be associated with "Stephen King," or may be a group classification identifying a group of one or more authors based on characteristics of the authors that fall within the defined group. For example, a first author profile may be defined for "Subject Matter Experts" and may be defined in terms of the characteristics of authors that would be considered "Subject Matter Experts" including specific names of individuals that have been recognized as subject matter experts, publications in which documents associated with the publications are considered to be authored by subject matter experts, organizations for which authors working for those organizations are considered to be subject matter experts, a threshold number of references to a document being indicative of the document being authored by a subject matter expert, a threshold number of documents directed to a same topic or domain being indicative of the corresponding author being a subject matter expert, or any of a plethora of other characteristics of authors, documents, publications, organizations, or the like, that are indicative of a category or classification of the authorship of a document.

Similarly, other group classifications for defining author profiles may be used. For example, another author profile may be defined for "Power Users" and a third author profile may be for "Novice" authors. Various features may be associated with such definitions of author profiles. For example, one feature may be that writings that use slang terms, "uh" or "um", or other non-formal language may be considered indicative of a "Novice" author while technical terms, references to trade journals, and the like, may be indicative of a "Subject Matter Expert." Any combination of features may be used to define different author profiles.

The author profiles may be defined for particular domains, topics, subject matter, or the like, with which the corpus of information is associated. For example, a corpus of information may be defined for "medical" documentation and corresponding author profiles may be associated with this corpus of information to thereby identify, for example, subject matter experts, power users, and novices with regard to the medical domain. The domain, topics, and subject matter definitions may be of various granularities, e.g., a domain for "medical", another domain for "cancer treatment", a third domain for "Hodgkin's Lymphoma," or the like. Thus, various author profiles may be defined for various corpora.

The definitions of the author profiles define the requirements for a document to be associated with the author profile. When determining whether a document is associated with a particular author profile, the extracted features of the document in the document profile, or content profile, may be compared against the features and relationships between features defined in the author profile to determine if the document satisfies the requirements for being associated with the author profile. In some illustrative embodiments, not all of the requirements of an author profile need to be met by the extracted features in the document profile. A predetermined threshold degree of matching of the extracted features of the document profile with the author profile may be defined and as long as the document profile equals or exceeds this threshold degree of matching, the document may be associated with the author profile.

It should be appreciated that the author profiles and the document profiles may not necessarily have a same configuration or organization. That is, in some illustrative embodiments, the author profiles and document profiles may have different fields from one another with only a subset of the fields of one profile being similar or related to one or more of the fields of the other profile. Thus, for example, an author profile may have many different fields that are not in a document profile, but may include a field for names of publications associated with the author and an author name. Similarly, a document profile may have many different fields but may also include a publication name for the document and an author name. The corresponding fields of the profiles may be compared to determine degrees of matching between the author profiles and the document, or content, profiles.

In addition, a default author profile may be provided for documents that do not satisfy the requirements for association with any of the other author profiles. Thus, for example, if the extracted features of a document do not sufficiently match any of the author profiles, then the document may be automatically associated with the default author profile. The consideration of author profile matching may be performed with regard to a single author of a document or a collection of multiple authors of a document. Thus, in some illustrative embodiments, a single document may be associated with multiple author profiles if multiple authors are associated with the document. In other illustrative embodiments, the authorship as a whole of the document may be considered for determining a single author profile with which the document is to be associated.

A data structure may be created and maintained in association with each of the predefined author profiles. The data structure stores an identifier, pointer, or other information about documents associated with the corresponding author profile such that the associated documents may be retrieved when ingesting documents for purposes of performing QA system or NLP system operations. Alternatively, the data structure may be an evaluation criteria instead of a data structure storing pointers to the documents the evaluation criteria may be used to filter. In such a case the data structure may be used to extract needed documents meeting the evaluation criteria from a larger corpus.

In one example embodiment, a user may specify, through a graphical user interface or the like, a desired priority by which to ingest documents for QA system or NLP system operations. The priority of ingestion of documents may be based on author profile. For example, a user may specify that they wish the QA system or NLP system to ingest and operate on "Subject Matter Expert" documents in a prioritized manner over other documents of other author profiles. Similarly, a user may specify a series of priorities for various author profiles such that a first author profile may be considered with highest priority, a second author profile may be considered with second highest priority, and so forth.

The graphical user interface may present author profile information for a selected corpus of information in any of a number of different ways. For example, the graphical user interface may present a table of author profiles, some common characteristics defining the author profiles, or other information that specifically identifies the types of authors and documents associated with the author profile. In other embodiments, the graphical user interface may present Venn diagrams or other graphical representations of the author profiles to assist a user is selecting a prioritization of author profiles for consideration by the system (QA system, NLP system, or the like).

The prioritization of the author profiles may be used to determine various ways in which to prioritize a subset of the corpus of information based on authorship characteristics of the documents in the corpus of information. Such prioritization may take the form of identifying which subset of documents in the corpus of information to ingest and operate on first, second, third, and so on. Such prioritization may affect the manner by which documents are scored when determining a degree of matching of the document with user submitted requests, e.g., user submitted questions to a QA system, requests for retrieving documents based on a search, requests to perform other NLP operations on documents, or the like. In some illustrative embodiments, the prioritization of author profiles may result in certain author profiles, and their associated subsets of documents from the corpus of information, being removed or eliminated from consideration by the system. If a document exists in association with multiple author profiles, then a conflict resolution may be performed such that if the document exists in association with any of the author profiles that have been given higher priorities, then the document is loaded and considered by the system, even if the document is also associated with a relatively low priority author profile that would otherwise be eliminated or ignored by the system.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments may be utilized in many different types of data processing environments. The mechanisms of the illustrative embodiments allow for prioritization of the ingestion of a corpus of information based on associations of documents with author profiles and user selection of priorities of author profiles. As mentioned above, the illustrative embodiments may be implemented with any analysis mechanism that operates on documents, portions of text, or other works of authorship that may be presented in an electronic form. In the illustrative embodiments, the analysis mechanism is considered to be a computerized system that performs natural language processing (NLP) operations on electronic documents, portions of text, or the like. In the example embodiments described herein, it will be assumed that the NLP operations are part of a question and answer (QA) system, such as the Watson™ QA system available from International Business Machines Corporation of Armonk, N.Y. It should be appreciated that the Watson™ QA system, and QA systems in general, are only used as an example and the illustrative embodiments are not limited to such.

Figure 2:
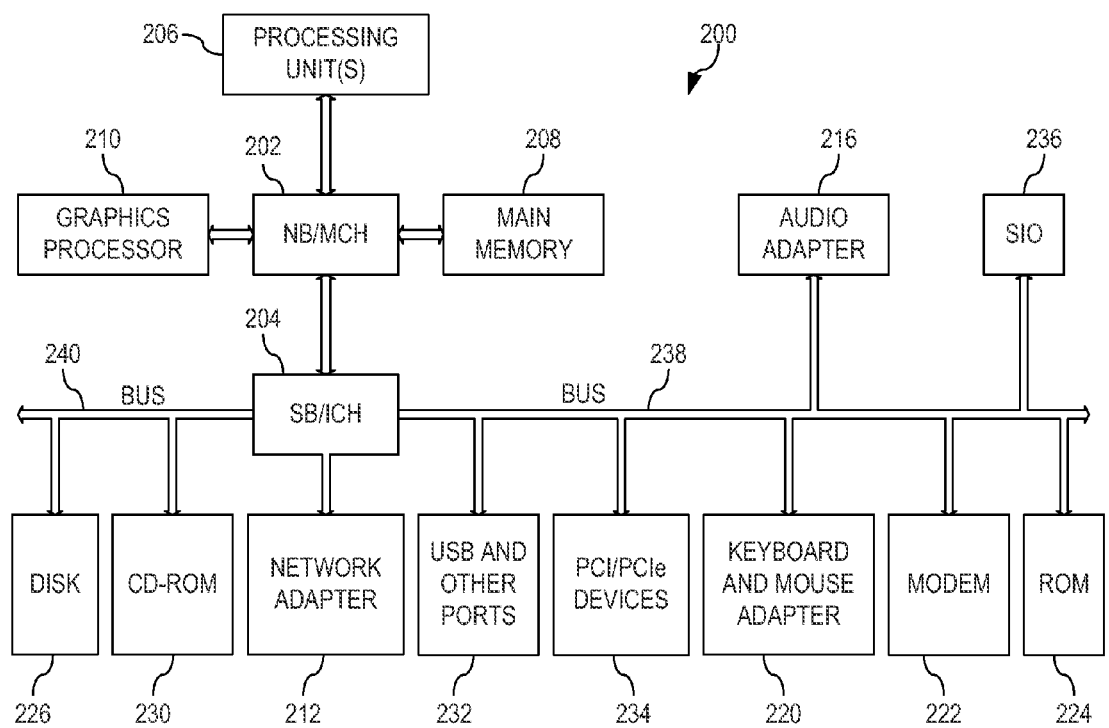
FIG. 2 is an example block diagram of a computing device in which aspects of the illustrative embodiments may be implemented.
Figure 3:
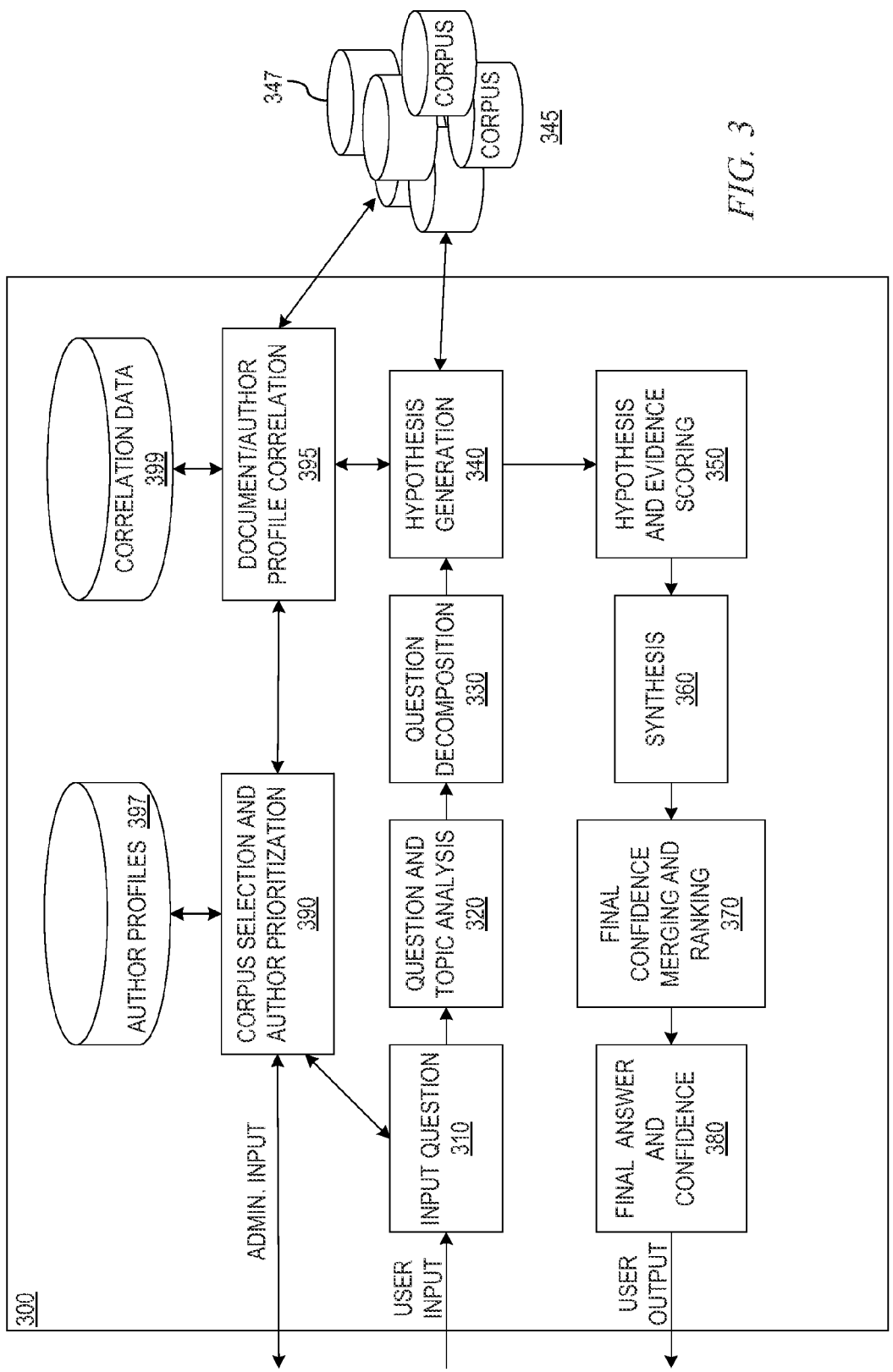
FIG. 3 is an example block diagram of a question and answer (QA) system pipeline in which aspects of the illustrative embodiments may be implemented.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to prioritizing the portions of a corpus of information ingested by the QA mechanisms based on associations of the portions of the corpus of information with author profiles. For purposes of the following description, the portions of the corpus of information will be considered to be one or more documents of the corpus of information. It should be appreciated, however, that a corpus of information may comprise statements, sub-portions of documents, or any other amount of textual content that may or may not be considered a "document." The illustrative embodiments may be applicable to any portion of text whether it be part of an electronic document or not.

Using a QA system as an example of the type of system in which the illustrative embodiments may be implemented, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpus of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpus of data/information 345. That is, these various sources themselves, collections of sources, and the like, may represent different corpus 347 within the corpora 345. There may be a different corpus 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

As shown in FIG. 3, in accordance the illustrative embodiments, a corpus selection and author prioritization engine 390 is provided along with an document/author profile correlation engine 395 for permitting a user to select what corpus of information 347, from the corpora 345, to use as a basis for generating candidate answers to an input question 310 and selecting a priority of author profiles to utilize when ingesting the selected corpus 347. The document/author profile correlation engine 395 may operate periodically, in response to an event, or continuously to analyze documents of various corpora 345 and correlate the documents with one or more predefined author profiles of a plurality of predefined author profiles 397, as described further hereafter. The corpus selection and author prioritization engine 390 provides user interfaces through which a user may select a corpus 347 and further may be presented with corresponding author profiles from the author profile data structure 397, which the user may select and/or prioritize to thereby control the ingestion of the documents from the selected corpus 347, as also described hereafter.

The author profiles data structure 397 stores author profiles that are defined for the various corpora 345 upon which the QA system pipeline 300 may operate. There author profiles data structure 397 may store separate sets of author profiles for each corpus in the corpora 345 such that one set of author profiles may be different from another. The definition of these author profiles may be performed in a manual manner, automatic manner, or semi-automatic manner. For example, a system administrator may be presented with a graphical user interface (GUI), for example via the corpus selection and author prioritization engine 390, through which a human system administrator may set forth features, relationships between features, thresholds, and rules for defining an author profile. These features may be directed to authorship information for documents, publication information for documents, source information for documents, numbers of related documents, numbers of references to the document, number of references in the document to other documents, numbers of documents authored by the same author in the related corpus, or any of a plethora of other possible features and relationships, thresholds, or rules associated with such features. The resulting author profiles generated by the system administrator may be stored in association with the corresponding corpus 347 in the author profiles data structure 397. There may be multiple author profiles generated and stored for a single corpus 347 and an author profile may also be shared across a plurality of corpora 345 by being associated with the various corpora 345 in the author profiles data structure 397.

In some embodiments, the corpus selection and author prioritization engine 390 may implement automated mechanisms for generating author profiles based on analysis of documents in a corpus 347. For example, through analysis of a document, various features related to the authorship, publication, source, etc., may be extracted. Similarities of these extracted features with extracted features of other documents in the same corpus 347 may be identified through these automated mechanisms, these similar features being directed to identifying a profile of the authors of the documents. For example, multiple documents may be published by the same publisher, have similar sources, and have the same author, author credentials, or the like, and the author may be considered to be a "subject matter expert" with regard to the subject matter, or domain, of the particular corpus 347. As a result, the automated mechanism may automatically generate an author profile of "subject matter expert" if one does not already exist, or may automatically update an existing "subject matter expert" profile, with the similar features and/or relationships between similar features found through the automated analysis. Of course a semi-automated process may also be used in which automated mechanisms provide suggestions as to new author profiles or updates to existing author profiles and presents these to a human system administrator for approval or denial of the suggested addition or update to the author profiles in the author profiles data structure 397.

For example, during training using a test corpus of information, the documents of the test corpus may be processed to generate various profiles including a "Nature" profile that stores phrases, keywords, patterns of terms, or other features extracted from documents pertaining to "Nature Expert." Authors that may be considered "Nature Experts" will tend to use similar features to those extracted from the documents of the test corpus and associated with the "Nature Experts" author profile. For example, the terms "mushroom", "fauna", and "dendrophilia" may be associated with the author profile "Nature Experts."

In addition to defining author profiles for the various corpora 345 and associating the author profiles with their corresponding corpora 345 in the author profiles data structure 397, the mechanisms of the illustrative embodiments further correlate the documents within each of the corpora 345 with one or more author profiles associated with the corresponding corpus. That is, the annotators used to perform analysis of documents for question answering as described previously, may also be used by the document/ author profile correlation engine 395 to correlate documents within a corpus with one or more author profiles associated with that corpus 347. The document/author profile correlation engine 395 may interface with the hypothesis generation stage 340 logic to make use of the annotators and the results of their processing on the documents of a selected corpus 347 or may have a separate set of annotators or separate interface with the annotators directly to achieve the analysis needed to correlate a document profile with an author profile in accordance with the illustrative embodiments.

The annotators extract features and natural language components from the documents including features directed to authorship, publication, source, etc. of the document. However, for performance purposes, rather than extracting all of the features and components from the document, a small segment may be extracted, e.g., the header, first few pages, first few paragraphs, or the like. These extracted features may be used to generate a document profile or model of the document. For example, a document from an online corpus may be processed and features extracted to generate a document profile that includes the features "blackbird", "redwinged blackbird", and "ornithological". Thus, from these features it can be determined that this document is a document associate with ornithology and more specifically contains content directed to blackbirds, and in particular redwinged blackbirds.

The features maintained in a document profile of a document may be compared, by the document/author profile correlation engine 395, against author profiles for the particular corpus 347, as retrieved from the author profiles data structure 397 via the corpus selection and author prioritization engine 390. The comparison of the document profile to the author profiles for the corpus 347 is to determine a degree of matching of the document profile with the requirements of the features, relationships between features, etc., set forth in the author profile. The degree of matching is a quantitative value that is a measure of how much of the requirements in the author profile are met or exceeded by the contents of the document profile. In addition, information from other document profiles may also be used to assist in this degree of matching evaluation such as to identify a number of documents in a corpus 347 that are authored by the same author, published by the same publisher, have a same source, etc.

Using the previous two examples, the document profile for the blackbird document may be compared to the "Nature Expert" author profile. Since there is little similarity between these two profiles, the degree of matching for these profiles would be relatively low. As a result, if "Nature Expert" author profile related documents are prioritized for processing, then the blackbird document would not be selected as part of the set of prioritized documents associated with the "Nature Expert" author profile.

A degree of matching value may be generated for each of the author profiles associated with the particular corpus 347 in which the document is present. That is, when the document/author profile correlation engine 395 determines it is time to analyze the documents in a corpus 347, such as by a specific request to do so from a system administrator via the corpus selection and author prioritization engine 390, a periodic time interval, an event occurring such as a change or update being made to a corpus 347 to add/remove/modify a document in the corpus 347, or the like, the documents of a selected corpus 347 are analyzed to generate document profiles for the documents and these document profiles are compared against each of the predefined author profiles for the selected corpus 347 to thereby generate a degree of matching value for the document profile for each of the author profiles. These degree of matching values are then compared by the document/author profile correlation engine 395 to one or more threshold values maintained by the document/author profile correlation engine 395 to determine which degree of matching values equal or exceed these one or more threshold values and thereby indicate a correlation between the document profile and the corresponding author profile. The one or more threshold values may be predefined by a system administrator or other authorized person and may be modified to adjust the operation of the document/author profile correlation engine 395 based on changing conditions of the QA system pipeline 300 or to achieve a desired operation of the QA system pipeline 300.

Assuming that at least one of the document profile's degree of matching values for the various author profiles equals or exceeds the one or more threshold values, an identifier, link, address, or other identifier of the corresponding document is added to a correlation entry in the correlation data structure 399 in association with the author profile and corpus identifier. Thus, entries in the correlation data structure 399 comprise a corpus identifier, an author profile identifier, and zero or more document identifiers to thereby correlate the document with a matching author profile of a particular corpus. This process may be repeated for each document in the selected corpus 347 and may further be repeated across each document of each corpus 347 in the corpora 345. If the operation of the document/author profile correlation engine 395 is triggered because of a change to a particular corpus 347, the operations described above may be performed specifically for only the changed documents in the corpus 347, e.g., if a new document is added to the corpus 347, then the operations may be performed with regard to only the new document while information obtained for the other documents of the corpus 347 may be unchanged and may be used to assist in the operations being performed for the new document, e.g., number of documents authored by the same author, etc.

Thus, through the operation of the document/author profile correlation engine 395, a correspondence between document profiles and author profiles is achieved and maintained in the correlation data structure 399. This correlation is based on the analysis of documents performed by annotators to extract features from the documents and logic of the document/author profile correlation engine 395 to generate a document profile based on these extracted features. Moreover, this correlation is based on the establishment of author profiles for a selected corpus either in a manual, automated, or semi-automated manner via the corpus selection and author prioritization engine 390. The resulting correlation data structure 399 entries may be used when handling user submitted requests for natural language processing operations, such as answering a submitted question via the QA system pipeline 300 in the depicted example, as described hereafter.

With the mechanisms of the illustrative embodiment depicted in FIG. 3, a user may input an input question 310 that the user wishes to be answered by the QA system pipeline 300 based on information in the corpora 345. The input question stage 310 logic may present a GUI through which a user may submit the input question 310. This GUI, in accordance with the illustrative embodiments, may further provide options for the user to select a corpus of information 347 which the user wishes to use as a basis for generating an answer to the input question 310. Based on a user's selection of a particular corpus 347, the user's selection may be communicated to the corpus selection and author prioritization engine 390 which then retrieves the associated author profiles for the selected corpus 347 from the author profiles data structure 397. A GUI indicating the available author profiles for the selected corpus 347 may be returned to the user so that the user may select a priority by which to ingest the documents of the selected corpus 347.

The GUI indicating the available author profiles for the selected corpus 347 may be presented in any of a number of ways including in a tabular form, as a Venn diagram, or the like. The particular author profiles may be presented by presenting a name of the author profile, e.g., "Subject Matter Experts," "Power Users," or "Novice Authors," or the like. In addition, features characteristic of the author profile may be listed to assist the user in selecting an appropriate priority of the author profiles, e.g., "Subject Matter Experts" may have the features of recognized expert authors in the particular subject matter, published in journals or trade periodicals, having a particular number of documents authored by the authors in the particular subject matter, etc.

The GUI indicating the available author profiles may further comprise user selectable GUI elements, fields, or the like, through which the user may specify a relative priority of the particular author profile relative to the other author profiles available for the selected corpus 347. The user may enter information into the GUI to specify which author profiles are considered more important to answer the input question 310 than others to thereby customize the operation of the QA system pipeline 300 to the user's desires regarding relative importance of authorship. The user input may be, for example, numerical entries specifying a priority ordering of the author profiles, selection of relative qualitative value indicators such as "highest", "lowest" or the like, selection of a user interface element to remove documents associated with a particular author profile from further consideration by the QA system pipeline 300, or the like.

Based on the user's input specifying relative priorities of author profiles for the selected corpus 347, the QA system pipeline 300 operations are tailored to the particular user input. For example, this may involve loading only the documents associated with a highest priority author profile, as determined from a corresponding entry for the corpus 347 and the author profile obtained from the correlation data structure 399, and evaluating the input question 310 against those documents to determine if a sufficiently high scoring candidate answer is generated. If so, then further evaluation of documents associated with other author profiles of the selected corpus 347 need not be performed. If not, then the documents associated with the next highest priority author profile may be loaded and added to the documents already considered and the QA system pipeline 300 operation applied to this expanded collection of loaded documents. This process may be repeated iteratively until a sufficiently high scoring candidate answer is identified or all of the documents associated with author profiles selected for consideration by the user have been loaded and processed through the QA system pipeline 300.

In another illustrative embodiment, the user input specifying relative priorities of author profiles may be used to adjust weights applied to document scores generated by the hypothesis and evidence scoring stage 350 logic. That is, the relative priorities may be used to more heavily weight documents associated with the higher priority author profiles and less heavily weight documents associated with lower priority author profiles. In this way, the evidence and sources of candidate answers originating with documents of a higher priority author profile are given greater credence and confidence than documents of lower priority author profiles. The weights may be quantitative values that are included in the scoring functions applied by the hypothesis and evidence scoring stage 350 logic as variables that are populated based on the particular author profile with which the document is associated and the user's input as to a relative priority of the author profile. If a document is associated with multiple author profiles, a highest priority rating of the author profiles with which the document is associated may be used.

Thus, through the mechanisms of the illustrative embodiments, a user is given the ability to customize or tailor the operation of the QA system pipeline 300, or other natural language processing system operation, to the user's own subjective determination as to what author profiles are more important or likely to generate correct results to a user request, e.g., a correct answer to an input question. The customized or tailored operation may be performed based on the author profiles associated with a user selected corpus 347 and the correlation of document profiles of documents from the selected corpus 347 with the author profiles.

As mentioned above, the corpus selection and author prioritization engine 390 may interface with the input question stage 310 logic, or otherwise provide one or more GUIs for use by a user to select a corpus of information 347 and specify priority ranking of author profiles for the selected corpus of information 347. FIG. 4 is an example diagram of a graphical user interface (GUI) for presenting author profile information for a selected corpora and receiving user selections of priorities for the author profiles in accordance with one illustrative embodiment.

As shown in FIG. 4, the GUI 400 includes a first portion 410 through which a user may select a corpus from a plurality of available corpora upon which the system operates. In the depicted example, the user has selected the corpus corresponding to cancer treatments. While FIG. 4 illustrates only one corpus being selected by the user, it should be appreciated that the user may select more than one corpora and the mechanisms of the illustrative embodiments would be applied to each of the corpora selected by the user.

A second portion 420 of the GUI may be automatically populated in response to the user's selection of one or more of the available corpora in the first portion 410 based on retrieved information for the author profiles associated with the selected corpus/corpora. GUI elements 430 are provided for entry of priority information, such as a relative priority ranking of the corresponding author profile. In the depicted example, these take the form of a free form text field into which the user may input a numerical ranking of the relative priorities, e.g., 1 being a highest priority and 10 being a lowest priority. In other illustrative embodiments, the GUI elements 430 may take the form of drop-down menus, radial buttons, check mark boxes, or any of a plethora of known GUI elements. As shown in FIG. 4, additional GUI elements 440 may be provided for a user to select to eliminate an author profile from further consideration.

Based on the user input to the GUI 400, the system is informed of which corpora the user wishes to use for performing the system's operations, e.g., QA system pipeline operations or other natural language processing operations, and which author profiles for the selected corpora are considered more/less important in generating the system operation results. The user input is used by the system to tailor its operation to the prioritized author profiles as previously described, thereby providing customized operation for the user.

Figure 5:
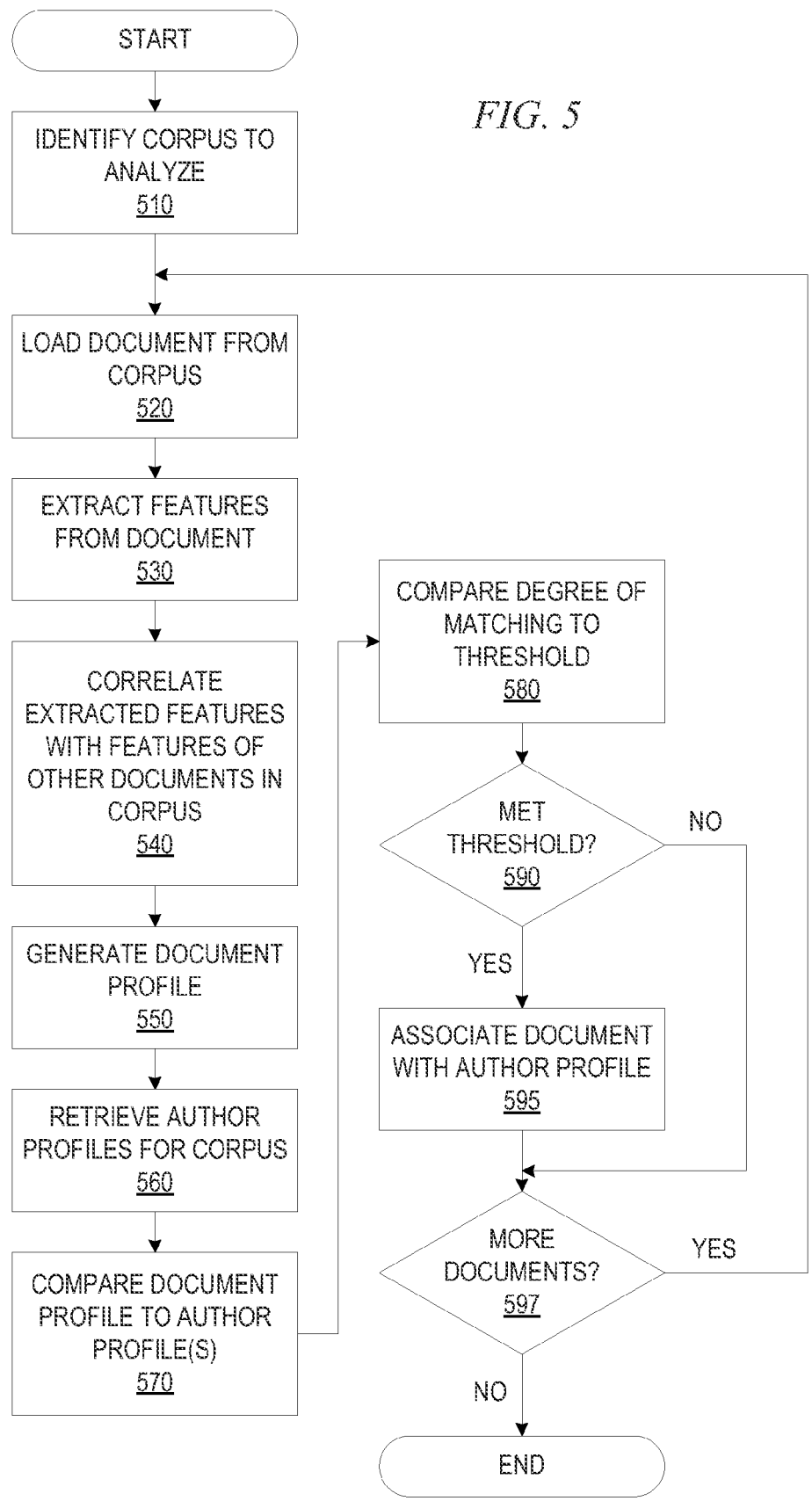
FIG. 5 is a flowchart outlining an example operation for correlating a document profile with an author profile in accordance with one illustrative embodiment.

FIG. 5 is a flowchart outlining an example operation for correlating a document profile with an author profile in accordance with one illustrative embodiment. As shown in FIG. 5, the operation starts with identifying a corpus to be analyzed (step 510) and then loading a document from the corpus for analysis (step 520). The document is analyzed to extract features from the document (step 530) and correlate extracted features with features of other documents in the corpus, e.g., to identify numbers of documents authored by the same author in the corpus or the like, if necessary (step 540). The operation generates a document profile based on the extracted features and correlation of extracted features with features of other documents in the corpus (step 550).

Author profiles associated with the identified corpus are retrieved (step 560) and the document profile is compared to the author profile to determine a degree of matching (step 570). The degree of matching is compared to one or more threshold values (step 580) to determine if the degree of matching equals or exceeds the one or more thresholds, i.e. to determine if the one or more thresholds are met (step 590). If the one or more thresholds are met, then the document associated with the document profile is associated with the author profile and corpus in a correlation data structure entry (step 595). If the one or more thresholds are not met, then the document is not associated with the author profile. It should be appreciated that this operation may be performed with regard to each author profile associated with the identified corpus. Moreover, if the document profile cannot be associated with any of the author profiles because the corresponding degrees of matching do not meet the requirements of the one or more thresholds, the document may be associated with a default author profile.

A determination is made as to whether additional documents need to be processed in the corpus (step 597). If so, the operation returns to step 520; otherwise the operation terminates.

Figure 6:
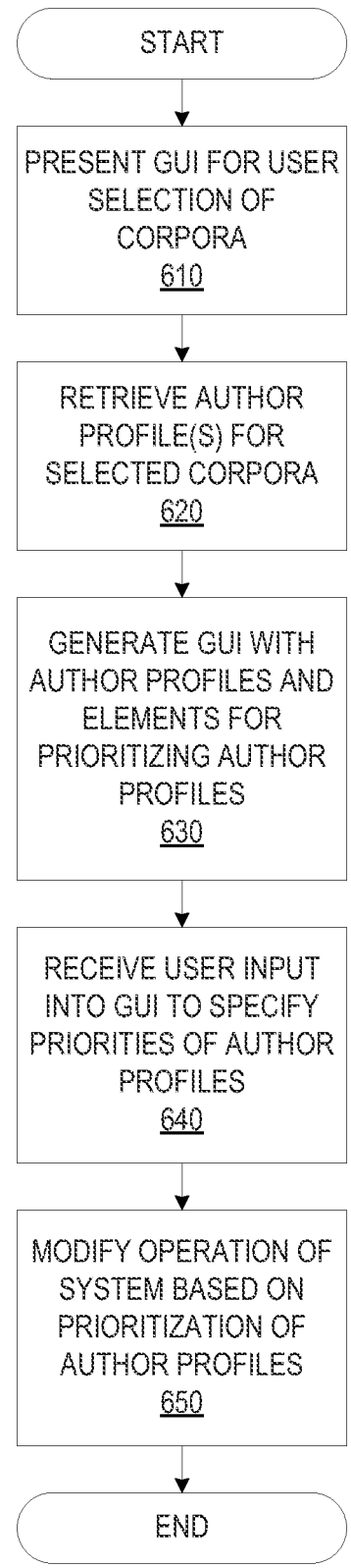
FIG. 6 is a flowchart outlining an example operation for prioritized loading of documents from a corpus of information based on author profiles in accordance with one illustrative embodiment.

FIG. 6 is a flowchart outlining an example operation for prioritized loading of documents from a corpus of information based on author profiles in accordance with one illustrative embodiment. As shown in FIG. 6, the operation starts by presenting a GUI to a user for selection of one or more corpora upon which to operate (step 610). Based on user input to the GUI selecting the one or more corpora, author profiles corresponding to the selected corpora are retrieved (step 620) and the GUI is updated, or another GUI is generated, to include the author profiles corresponding to the selected corpora and providing GUI elements for specifying priorities for the various author profiles (step 630). User input is received into the GUI to specify the priorities of the various author profiles (step 640) and an operation of the system is modified based on the assigned priorities of the various author profiles so as to emphasize or give preferential treatment to documents associated with author profiles having relatively higher priorities (step 650). The operation then terminates.

Thus, the illustrative embodiments provide mechanisms for utilizing author profiles to prioritize the ingestion and natural language processing of documents in one or more corpora of information. The illustrative embodiments permit a user to specify how to customize the operation of a natural language processing system to tailor the operation to the user's own subjective determination as to the importance of subsets of documents within one or more corpora. In this way, document ingestion is prioritized based on user input.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for processing a corpus of information in a natural language processing system, the method comprising:

identifying, by the data processing system, a corpus of information to process;

retrieving, by the data processing system, a set of author profiles associated with the corpus of information;

presenting, by the data processing system, a user interface that comprises the set of author profiles, through which a user input is received specifying a user selection of at least one user selected author profile in the set of author profiles;

generating, by the data processing system, a content profile for a portion of content of the corpus of information;

comparing, by the data processing system, the content profile to the set of author profiles to generate an association of the content profile with at least one author profile in the set of author profiles; and controlling a processing operation of the natural language processing (NLP) system based on the association of the content profile with the at least one author profile and a determined level of correspondence of the at least one author profile with the at least one user selected author profile, wherein the processing operation is an ingestion operation that ingests portions of content from the corpus of information, wherein controlling the processing operation of the NLP system based on the association of the content profile with the at least one author profile and a determined level of correspondence of the at least one author profile with the at least one user selected author profile, comprises:

ingesting first content, associated with a first user selected author profile having an associated first user specified priority value associated with the first user selected author profile, from the corpus into the NLP system and performing an NLP operation on the first content; and ingesting second content, associated with a second user selected author profile having an associated second user specified priority value associated with the second user selected author profile, after ingesting the first content and performing the NLP operation on the first content, and performing the NLP operation on the second content, wherein the first user specified priority value indicates a higher priority associated with the first user selected author profile than the second user specified priority value.

2. The method of claim 1, wherein controlling the processing operation of the NLP system comprises prioritizing processing of portions of content of the corpus of information based on associations of content profiles, associated with the portions of content, with author profiles in the set of author profiles.

3. The method of claim 2, wherein the prioritizing is performed based on user specified priorities assigned to each of the author profiles in the set of author profiles, wherein at least two of the author profiles have non-zero priorities.

4. The method of claim 3, wherein the user specified priorities include a user specified priority to remove portions of content associated with a specific author profile in the set of author profiles, from further use in the processing operation of the NLP system.

5. The method of claim 1, wherein each author profile in the set of author profiles specifies characteristics of either a particular individual author or a group of authors having at least one common characteristic.

6. The method of claim 1, further comprising:
outputting, by the data processing system, a graphical user interface listing the set of author profiles associated with the corpus of information;
receiving, by the data processing system, a user input to the graphical user interface specifying a priority ordering of author profiles in the set of author profiles; and
controlling the processing operation of the NLP system based on the user input specifying the priority ordering of author profiles.

7. The method of claim 6, wherein the graphical user interface listing of the set of author profiles further comprises, for each author profile in the set of author profiles, a listing of one or more common characteristics or features associated with the author profile which are common to all authors associated with the author profile.

8. The method of claim 1, further comprising:
storing, for each author profile in the set of author profiles, in association with the author profile, a corresponding data structure storing pointers to portions of content in the corpus of information that are associated with the author profile.

9. The method of claim 1, wherein the NLP system is a question and answer (QA) system, and wherein controlling a processing operation of the NLP system comprises controlling the ingestion of documents from the corpus of information, for generating candidate answers for a question input by a user, based on user specified priority values assigned to author profiles in the set of author profiles.

10. The method of claim 9, wherein controlling the processing operation of the NLP system comprises:
ingesting a first sub-set of documents from the corpus of information based on a relative priority of a first user selected author profile associated with the first sub-set of documents compared to priorities of other user selected author profiles in the at least one user selected author profile;
performing a QA system operation of the QA system on the first sub-set of documents to generate a first candidate answer to an input question;
determining whether the first candidate answer has a corresponding confidence score equal to or above a threshold confidence score; and
in response to the corresponding confidence score not being equal to or above the threshold confidence score:
ingesting a second sub-set of documents from the corpus of information associated with a second user selected author profile having a relatively lower priority than the first user selected author profile; and
performing the QA system operation on the second sub-set of documents to generate a second candidate answer to the input question.

11. The method of claim 10, wherein ingesting the second sub-set of documents comprises adding the second sub-set of documents to the first sub-set of documents, and wherein performing the QA system operation on the second sub-set of documents comprises performing the QA system operation on the combination of the first sub-set of documents and the second sub-set of documents.

12. The method of claim 9, wherein controlling the processing operation of the NLP system comprises modifying weights applied by the QA system to generate confidence scores for candidate answers based on relative priorities associated with the at least one user selected author profiles.

13. The method of claim 1, wherein controlling the processing operation comprises ingesting the portion of content by the natural language processing system in response to the at least one author profile, associated with the content profile of the portion of content, being a user selected author profile in the at least one user selected author profile.

14. The method of claim 1, wherein controlling the processing operation of the NLP system comprises prioritizing processing of portions of content of the corpus of information based on associations of content profiles, associated with the portions of content, and user selected author profiles in the at least one user selected author profiles, wherein the prioritizing is performed based on user specified priorities assigned to user selected author profiles in the at least one user selected author profiles, and wherein controlling the processing comprises ingesting portions of content of the corpus of information having associated higher user specified priorities before other portions of content of the corpus of information having associated lower user specified priorities.

15. The method of claim 1, wherein controlling the processing operation of the NLP system further comprises:
performing a conflict resolution operation in response to a portion of content in the corpus of information being associated with more than one user selected author profile, wherein the conflict resolution operation operates in favor of a highest priority value associated with user selected author profiles in the more than one user selected author profile.

16. A computer program product comprising a non-transitory computer readable medium having a computer readable program stored therein, wherein the computer readable program, when executed on a computing device, causes the computing device to:

identify a corpus of information to process;

retrieve a set of author profiles associated with the corpus of information;

present a user interface that comprises the set of author profiles, through which a user input is received specifying a user selection of at least one user selected author profile in the set of author profiles;

generate a content profile for a portion of content of the corpus of information;

compare the content profile to the set of author profiles to generate an association of the content profile with at least one author profile in the set of author profiles; and control a processing operation of the natural language processing (NLP) system based on the association of the content profile with the at least one author profile and a determined level of correspondence of the at least one author profile with the at least one user selected author profile, wherein the processing operation is an ingestion operation that ingests portions of content from the corpus of information, wherein controlling the processing operation of the NLP system based on the association of the content profile with the at least one author profile and a determined level of correspondence of the at least one author profile with the at least one user selected author profile, comprises:

ingesting first content, associated with a first user selected author profile having an associated first user specified priority value associated with the first user selected author profile, from the corpus into the NLP system and performing an NLP operation on the first content; and ingesting second content, associated with a second user selected author profile having an associated second user specified priority value associated with the second user selected author profile, after ingesting the first content and performing the NLP operation on the first content, and performing the NLP operation on the second content, wherein the first user specified priority value indicates a higher priority associated with the first user selected author profile than the second user specified priority value.

17. The computer program product of claim 16, wherein the computer readable program causes the computing device to control the processing operation of the NLP system at least by prioritizing processing of portions of content of the corpus of information based on associations of content profiles, associated with the portions of content, with author profiles in the set of author profiles.

18. The computer program product of claim 17, wherein the prioritizing is performed based on user specified priorities assigned to each of the author profiles in the set of author profiles, wherein at least two of the author profiles have non-zero priorities.

19. The computer program product of claim 18, wherein the user specified priorities include a user specified priority to remove portions of content associated with a specific author profile in the set of author profiles, from further use in the processing operation of the NLP system.

20. The computer program product of claim 16, wherein each author profile in the set of author profiles specifies characteristics of either a particular individual author or a group of authors having at least one similar characteristic.

21. The computer program product of claim 16, wherein the computer readable program further causes the computing device to:

output a graphical user interface listing the set of author profiles associated with the corpus of information;

receive a user input to the graphical user interface specifying a priority ordering of author profiles in the set of author profiles; and control the processing operation of the NLP system based on the user input specifying the priority ordering of author profiles.

22. The computer program product of claim 16, wherein the computer readable program further causes the computing device to:

store, for each author profile in the set of author profiles, in association with the author profile, a corresponding data structure storing pointers to portions of content in the corpus of information that are associated with the author profile.

23. The computer program product of claim 16, wherein the NLP system is a question and answer (QA) system, and wherein controlling a processing operation of the NLP system comprises controlling the ingestion of documents from the corpus of information, for generating candidate answers for a question input by a user, based on user specified priority values assigned to author profiles in the set of author profiles.

24. An apparatus comprising:

a processor; and a memory coupled to the processor, wherein the memory comprises instructions which, when executed by the processor, cause the processor to:

identify a corpus of information to process;

retrieve a set of author profiles associated with the corpus of information;

present a user interface that comprises the set of author profiles, through which a user input is received specifying a user selection of at least one user selected author profile in the set of author profiles;

generate a content profile for a portion of content of the corpus of information;

compare the content profile to the set of author profiles to generate an association of the content profile with at least one author profile in the set of author profiles; and control a processing operation of the natural language processing (NLP) system based on the association of the content profile with the at least one author profile and a determined level of correspondence of the at least one author profile with the at least one user selected author profile, wherein the processing operation is an ingestion operation that ingests portions of content from the corpus of information, wherein controlling the processing operation of the NLP system based on the association of the content profile with the at least one author profile and a determined level of correspondence of the at least one author profile with the at least one user selected author profile, comprises:

ingesting first content, associated with a first user selected author profile having an associated first user specified priority value associated with the first user selected author profile, from the corpus into the NLP system and performing an NLP operation on the first content; and ingesting second content, associated with a second user selected author profile having an associated second user specified priority value associated with the second user selected author profile, after ingesting the first content and performing the NLP operation on the first content, and performing the NLP operation on the second content, wherein the first user specified priority value indicates a higher priority associated with the first user selected author profile than the second user specified priority value.

* * * * *